Dec. 14, 1948. E. K. LOFTON 2,456,518
V-FLAT DRIVE
Filed Dec. 29, 1944 2 Sheets-Sheet 2
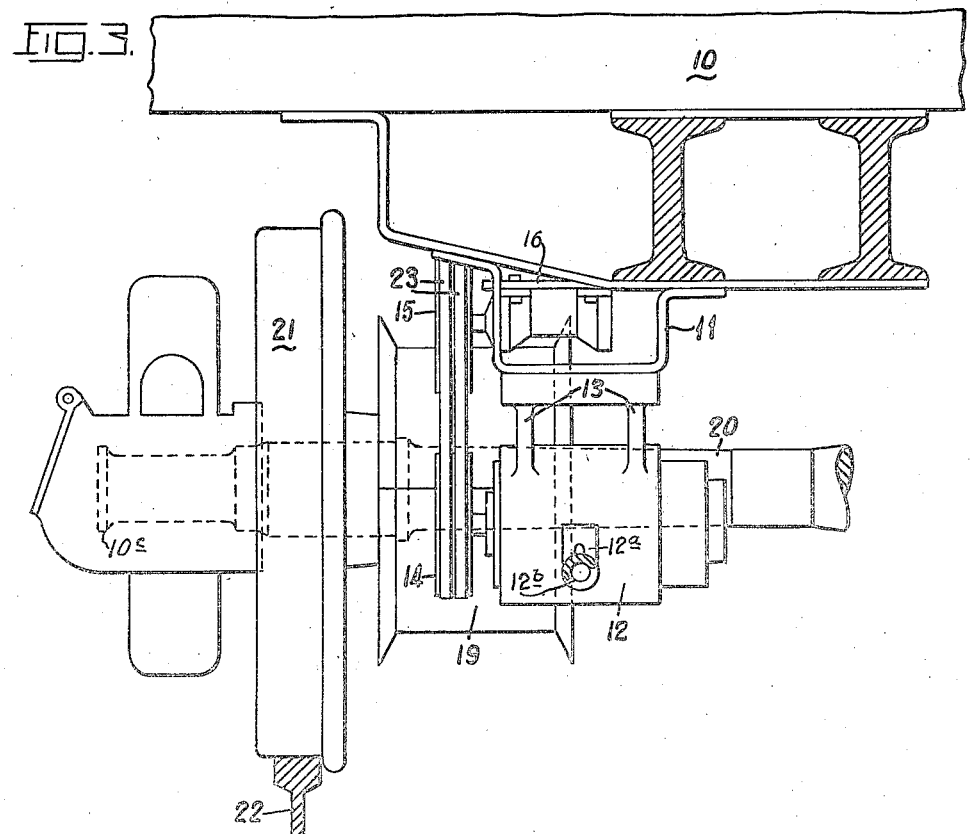
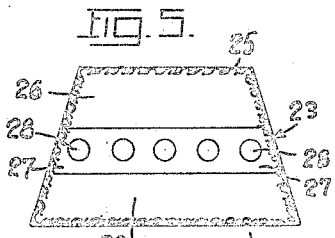
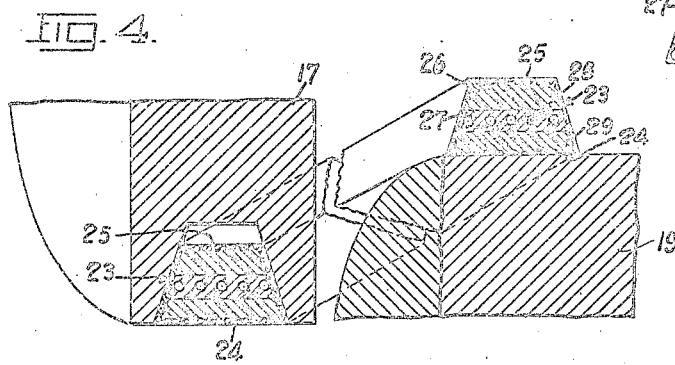
INVENTOR
EDGAR K. LOFTON,
BY
ATTORNEYS Patented Dec. 14, 1948

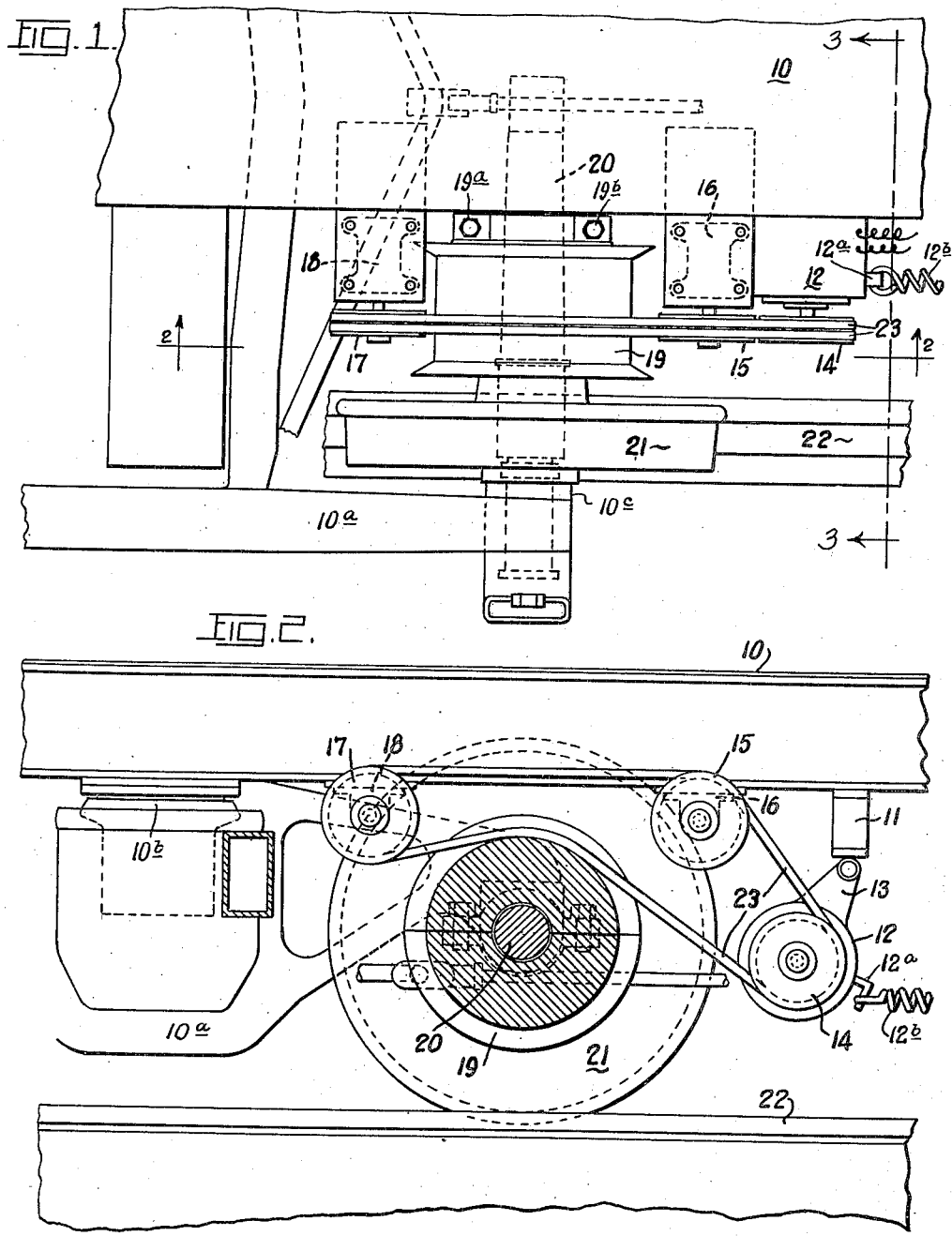

2,456,518

UNITED STATES PATENT OFFICE 2,456,518

V-FLAT DRIVE

Edgar K. Lofton, Lake Bluff, Ill., assignor to The Dayton Rubber Company, a corporation of Ohio Application December 29, 1944, Serial No. 570,273

7 Claims. (Cl. 74—221)

This invention relates to generator drives for vehicles and in particular to generator drives for rail vehicles.

The object of the invention is to provide a multiple V-belt drive supported on the frame of the vehicle and passing over the driving pulley of a generator actuated by engagement with a pulley or driving drum mounted upon the axle of the vehicle.

It is a further object to provide for the application of the V-belt wherein its relatively broader and normally upper surface engages a driving drum while the driven pulley on the generator, and the idler pulleys carried on the vehicle, makes engagement with the belt through the side walls thereof. The advantage thereby is gained by utilizing the maximum traction surface on the belt where it engages the driving drum and the normal driving surface on the side walls of the belt where it engages the driven pulley on the generator.

It is a further object to provide for maintaining the belt in its substantially maximum driving condition by placing spring tension upon the generator so as to maintain the belt in driving engagement simultaneously with both the driven pulley of the generator and the driving drum on the axle of the vehicle.

It is a further object to provide a construction in which endless belts may be employed and end belts with their connectors may be eliminated.

It is an additional object to provide a ready means of mounting and remounting the belt to facilitate inspection.

It is another object to provide an arrangement of driving and driven sheaves or pulleys in such a manner as to secure a balanced wear on both the top and side walls of the belt and to eliminate the concentration of all wear on the side walls of the belt.

It is an additional object to provide against the use of split pulleys in order to use endless belts. Split pulleys may be employed, yet they are not necessary in the arrangement of this invention and likewise endless belts can be employed, but they, likewise, are not necessary in the practice of this invention. The principle of the invention still applies where the pulleys are split or the belts are split, but one of the advantages of this invention is that it permits the use of pulleys that are not split and belts that are endless.

Referring to the drawings:

Figure 1 is a diagrammatic plan view showing the arrangement of the drive as applied to a rail vehicle such as a caboose of a freight train;

Figure 2 is a section on the line 2—2 of Figure 1 looking in the direction of the arrows, Figure 3 is a vertical section on the line 3—3 of Figure 1, Figure 4 is a diagrammatic view showing the drive drum and driven pulley and the association of the belt therewith, and Figure 5 is a line diagram showing the construction of a transmission belt adapted for use with this invention.

Referring to the drawings in detail, 10 indicates the under frame of the rail vehicle which is supported by the usual articulated truck, the pivotal support between the frame 10 and the truck 10a being indicated at 10b.

The ends of the truck support the usual journal bearing 10c in which are mounted the axles 20 that carry the wheels 21. Mounted on the axle 20, internally of the wheels 21 and adjacent the under side of the frame 10 is the main driving drum 19. The wheels 21 are mounted in conventional manner upon the rail 22.

The pulleys 15 and 17 are mounted respectively upon the brackets 16 and 18 on the under side of the frame member 10. The bracket 11 on the under side of the frame member 10 pivotally supports the swinging generator cradle 13 which, in turn, supports the generator 12.

Mounted on the generator armature of the generator 12 is a driven V-shaped pulley 14. Also connected to the generator 12 through a bracket 12a is a spring 12b, the other end of which is connected to the frame 10 of the vehicle or to some suitable supporting abutment. In this way the generator is normally pulled to the right hand as viewed in Figure 2.

Mounted within the grooves of the pulley 14 constituting the driven end of the drive are a plurality of V-shaped belts 23. These belts are also mounted upon the idler pulleys 15 and 17 and the upper or outer surface of the belt 23 engages the surface of the driving drum 19.

Figures 1 and 3 show that the drum 19 is wide enough to permit the truck 10a to turn through its normal angle without impairing the driving efficiency of the arrangement of this invention.

Figure 4 illustrates, diagrammatically, how the pulley 17 is engaged by the sloping side of the belt 23 while the outer portion 24 of the belt is engaged by the surface of the drum 19.

In Figure 5 a typical belt construction is diagrammatically illustrated. The belt 23 comprises the narrow transverse surface 25 and the wider transverse surface 24, and may have a fabric wrap thereon over a body portion of rubberlike material which comprises a neutral axis section 27 including substantially non-extensible longitudinal tension members 28. The neutral axis section is so located that the belt 23 may flex in either direction in order efficiently to engage both the driving drum 19 and the driven and idler pulleys 14, 15 and 17.

This arrangement provides a belt, or series of belts, that are kept under suitable tensions to drive generator 12 through their side walls which engage with the sheaves or pulleys 14, 15 and 17 and the exterior of the belt, or the top of the belts or belt, engages the drum 19 which acts as the driving agency for actuating the belts and, therefore, the generator.

As is indicated in the drawings, the driving drum 19 is split and may be detachably mounted upon the axle. This is accomplished through the attachment or detachment of the retaining bolts 19a and 19b. However, this is not essential to the invention but is a convenience for various purposes in connection with equipping existing railway cars or for the purposes of convenience in removing and repairing the drum. It will be noted that it is possible with this construction to accomplish the very desirable results of using endless V-belts which can be mounted and remounted without the necessity of either using split pulleys and split drums.

It will be understood that I desire to comprehend within my invention such modifications as may be necessary in the adaptation of the invention to various uses while still remaining within the scope of the hereinafter appended claims.

Having thus fully described my invention what I claim as new and desire to secure by Letters Patent is:

1. In combination, in a vehicle drive for a generator, of a vehicle frame, and a truck pivoted to said frame comprising axle and wheels, a driving drum on said axle, a generator carried on said frame and a driven pulley therefor, a plurality of idler pulleys on said frame and a plurality of V-belts adapted to engage with the generator and idler pulleys through the side walls and with the driving drum through the top of the belt.

2. In combination, in a generator drive on a wheeled vehicle, a vehicle frame and a truck pivoted to said frame comprising wheels and an axle, a flat driving drum on said axle, a plurality of pulleys having V-shaped grooves comprising idler pulleys and a driven pulley and a plurality of V-shaped belts mounted in said grooves having the upper surface of said belts engaging the flat drum on the axle whereby the driving engagement between the belt and the drum is on the top of the belt and the driving engagement between the belt and the driven pulley is between the sides of the belt and the V-shaped groove of the pulley.

3. In a rail vehicle drive for a generator, the combination of, a vehicle frame, a truck pivoted on said frame comprising a truck frame, axle and wheel, a driving drum mounted upon one of the axles of said wheel, a plurality of spaced idler pulleys suspended from said vehicle frame and above said axle on either side thereof and a yieldably actuated, pivotally mounted generator suspended to one side of said axle and from said vehicle frame a V-shaped pulley mounted on said generator to drive it and a V-shaped belt mounted within the V-shaped groove of said pulley and over the V-shaped pulley adapted to engage said pulleys through the side walls of the belt and also adapted to engage said driving drum on the axle through the top of the belt whereby the axle driven drum actuates said belt to drive it through the top thereof and the actuation is imparted to the driven pulley on the generator through the side walls of the belt.

4. In combination, in a rail vehicle generator drive, of a driving drum mounted upon an axle of a truck pivoted to the vehicle frame, V-shaped pulleys mounted on the frame of the vehicle on each side of the drum on the axle, a belt adapted to engage with the driving drum to be driven thereby while the position of the drum shifts with the pivotal movement of the truck and the side of the belt adapted to engage the V-shaped pulley to drive said pulley.

5. In combination, in a vehicle such as a rail vehicle having a body frame and a truck pivoted on the frame comprising axle and wheels, a drum mounted on said axle, a plurality of V-shaped grooved idler pulleys mounted on said frame on either side of said axle, a generator pivotally suspended beneath the frame of said vehicle, a pulley mounted on said generator having a V-shaped groove, and a V-shaped belt mounted with its side walls engaging the grooves of said pulleys and the top of the belt engaging the drum on the axle of the vehicle, said drum being substantially wider than the width of the belt whereby the axle may swing with the pivoted truck without disengaging the driving drum from the top surface of the belt, and yielding means continuously urging said generator about its pivot to tighten said belt.

6. In combination, in a rail vehicle having a frame and a truck pivoted thereto and having an axle, a generator drive carried entirely by said frame and consisting of V-shaped pulleys journaled on the said frame on each side of said axle, a generator pivotally supported on said frame at one side of said axle and having a V-shaped pulley on its drive shaft, a V-shaped belt engaging the grooves in said pulleys with its side walls, a flat drum attached to said axle and engaging said belt on the back thereof for driving the same, and yielding means continuously urging said generator toward belt tightening position.

7. In combination, in a V-belt drive, a relatively long flat pulley, a plurality of V-shaped pulleys arranged on opposite sides of said flat pulley and having their axes of rotation normally parallel to the axis of rotation of said flat pulley, a V-shaped belt engaging the grooves of said V-shaped pulleys through its side walls and said flat pulley through its back, and yielding means continuously urging at least one of said V-shaped pulleys toward belt tightening position, and means supporting said flat pulley for pivoting movements about a line spaced from the axis of the pulley and generally perpendicular to the axes of all of said pulleys.

EDGAR K. LOFTON.

REFERENCES CITED

The following references are of record in the file of this patent:

UNITED STATES PATENTS

| Number | Name | Date |
|---|---|---|
| 500,579 | Ide | July 4, 1893 |
| 768,392 | Moskowitz | Aug. 23, 1904 |
| 1,751,621 | Dake | Mar. 25, 1930 |
| 1,982,299 | Hapgood | Nov. 27, 1934 |
| 2,073,668 | Wilson | Mar. 16, 1937 |